United States Patent [19]

Williams

[11] 4,318,280
[45] Mar. 9, 1982

[54] DUAL PROPERTY SHAFT

[75] Inventor: James R. Williams, Martinsville, Ind.

[73] Assignee: General Motors Corporation, Detroit, Mich.

[21] Appl. No.: 131,656

[22] Filed: Mar. 19, 1980

[51] Int. Cl.³ .................. F16C 1/00; F04B 17/00
[52] U.S. Cl. ........................... 64/1 S; 64/1 R; 64/2 R; 417/406; 417/407; 74/574
[58] Field of Search .............. 64/1 S, 1 V, 1 R, 2 R; 74/574; 417/406, 407

[56] References Cited

U.S. PATENT DOCUMENTS

| 1,891,505 | 12/1932 | Scudder | 64/1 S |
| 2,001,167 | 5/1935 | Swennes | 64/1 V |
| 3,024,626 | 3/1962 | Frischman | 64/1 S |
| 3,263,450 | 8/1966 | Condon | 64/1 V |
| 3,413,872 | 12/1968 | Haworth | 74/574 |
| 3,651,661 | 3/1972 | Darrow | 64/1 R |
| 3,814,549 | 6/1974 | Cronstedt | 64/1 R X |
| 4,059,971 | 11/1977 | Beam | 64/1 V |
| 4,272,971 | 6/1981 | Loyd et al. | 64/1 S |

FOREIGN PATENT DOCUMENTS

| 112790 | 4/1929 | Austria | 64/1 S |
| 54-5150 | 1/1979 | Japan | 64/1 R |
| 54-5151 | 1/1979 | Japan | 64/1 R |
| 404153 | 1/1934 | United Kingdom | 64/1 V |

Primary Examiner—Wendell E. Burns
Attorney, Agent, or Firm—J. C. Evans

[57] ABSTRACT

A power turbine rotor drive shaft has a flanged end connected to a turbine rotor disc supported by a rotor bearing housing so as to be rotatably supported by a turbine rotor bearing assembly at one end of the shaft and including a second splined end thereon coupled to a shaft extension supported at one portion thereof by a roller bearing shaft assembly and wherein the shaft has a predetermined fundamental bending vibration mode between the rotor bearing assembly and the shaft bearing assembly and wherein an insert sleeve is shrunk-fit within an inside diameter of the shaft to stiffen the shaft so as to increase the fundamental bending vibration mode of the resultant composite shaft without excessively increasing the weight of the composite shaft.

4 Claims, 2 Drawing Figures

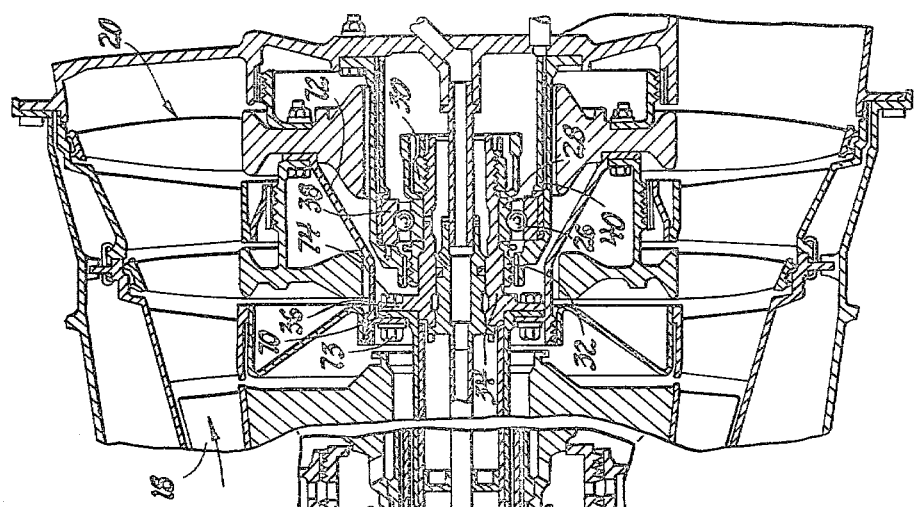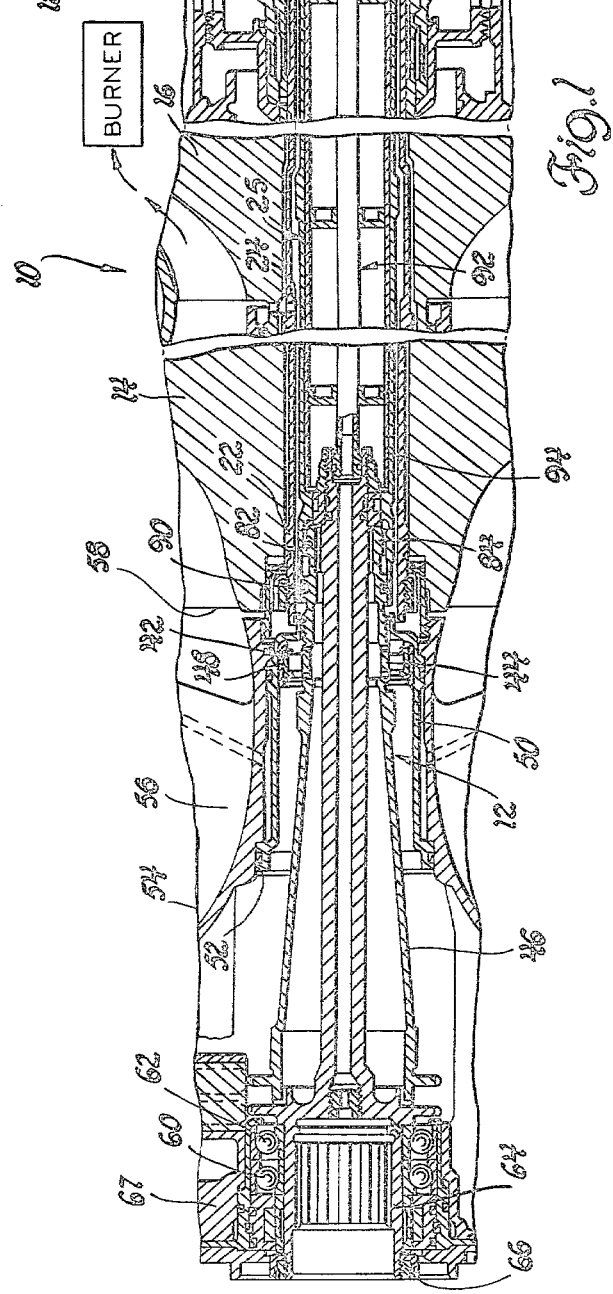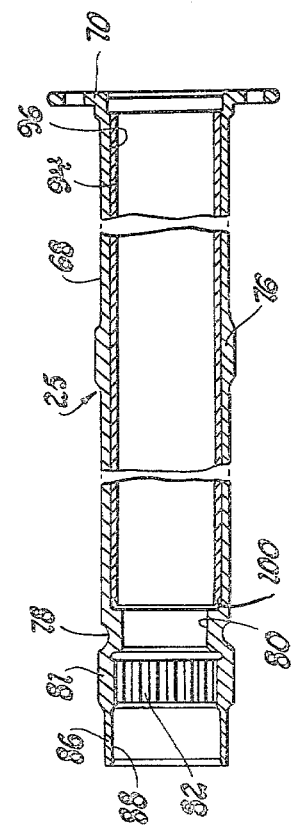
Fig.1
Fig.2

DUAL PROPERTY SHAFT

The invention herein described was made in the course of work under a contract or subcontract thereunder with the Department of Defense.

This invention relates to turbine drive shaft assemblies and more particularly to turbine drive shaft assemblies having means for increasing the fundamental bending mode of the shaft between bearing support components at spaced locations thereon.

It is recognized that the first fundamental vibration mode of a turbine rotor drive shaft can be increased by increasing stiffness of the shaft thereby preventing shaft resonance during high speed gas turbine rotor operation.

However, materials having increased modulus of elasticity often are brittle and are subject to damage at connection points between the shaft and other operating components of a gas turbine engine.

Accordingly, an object of the present invention is to provide an improved power turbine rotor drive shaft construction of increased fundamental bending vibration mode including an outer steel shell having shaft connector means formed at opposite ends thereof for connection to high strength components of a rotor drive shaft system and further including an insert sleeve of high modulus material that is shrunk-fit to the inside diameter of the steel shell through most of the length thereof and in contact with most of the full planar extent of the inner surface of the steel shell between the connections on the opposite ends thereof; the insert having a modulus of elasticity greater than that of said steel shell to increase the stiffness of the shaft and further having a density less than that of the steel shell whereby the fundamental bending vibration mode of the combined steel shell and the high modulus insert therein will be increased without excessively increasing the weight of the overall shaft construction.

Still another object of the present invention is to provide an improved power turbine rotor drive shaft construction having an increased fundamental bending vibration mode and including a tubular steel shaft having a connection flange on one end thereof and including a spline connection at the opposite end thereof adapted to be connected respectively to a rotor disc and to an output power shaft and wherein a thin walled insert is shrunk-fit to the tubular steel shaft between the connection flange and the splined connection thereon to overlie most of the full planar extent to seat firmly to the inside diameter of the tubular steel shaft and wherein the insert is high purity beryllium having a modulus of elasticity to stiffen the tubular steel shaft between the connections thereon and having a density lower than that of the material of the shaft to stiffen the shaft to cause its fundamental bending vibration mode to be increased without excessively increasing the weight of the overall shaft construction.

Further objects and advantages of the present invention will be apparent from the following description, reference being had to the accompanying drawings wherein a preferred embodiment of the present invention is clearly shown.

FIG. 1 is a fragmentary, longitudinal sectional view of a power turbine drive shaft assembly in accordance with the present invention; and FIG. 2 is a longitudinal cross-sectional view of a composite turbine drive shaft included in the assembly of FIG. 1 and constructed in accordance with the present invention.

Referring now to FIG. 1, a gas turbine engine 10 is partially illustrated including a core drive shaft assembly 12 for coupling a first stage radial compressor rotor 14 and a second stage radial compressor rotor 16 to a high pressure turbine rotor 18. Assembly 12 also couples a low pressure turbine 20 to a power output shaft 22.

In accordance with the present invention, the core drive shaft assembly 12 includes a compressor drive shaft 24 that is telescoped over an inner composite drive shaft 25 constructed in accordance with the present invention.

The composite drive shaft 25 illustrated is typical of those that have bearing supports at opposite ends thereof and include a length that can have excessive bow when its primary vibration mode occurs within the operating speed range of the low pressure turbine 20.

More particularly, an outboard rotor bearing assembly 26 includes an inner race 28 held in place by a lock nut 30 on a bearing support member 32. A seal stator 34 seated on the inner surface of bearing support member 32 has a radial flange 36 at one end thereof. The rotor bearing assembly 26 further includes an outer race 38 thereon held in place by an outer annular bearing support element 40.

Additionally, the shaft assembly 42 includes an intermediate roller bearing assembly 42 having an inner race defined by a surface segment 44 of a divergent generally conically configured power output shaft 46. Roller bearing assembly 42 includes an outer race 48 supported within a bearing support member 50 seated in an annular stepped shoulder 52 inside of an inner shroud 54 defining part of an annular inlet passage 56 for air flow to the eye 58 of the first stage radial compressor rotor 14. Power shaft supporting ball bearings 60, 62 are located on a forward hub 64 held in place by a fastener nut 66 located in the inlet nose 67 of the gas turbine engine 10.

Such a drive shaft 25 can have vibration movement therein which can occur at one or more frequencies represented by the natural frequencies of the shaft. One such frequency is the first fundamental bending mode and if the frequency of the drive forces applied to the shaft are of a value to excite the natural frequency, induced vibrations may cause excessive amplitudes in the shaft. In such cases, prior shafts have been stiffened by increasing the shaft diameter. Hence, the bore sizes through the aligned rotors are increased to accommodate the greater diameter and sometimes excessive rotor stress can occur.

In accordance with the present invention, the lowest frequency at which such vibration will occur within the shaft is raised above the speed range of operation of shaft 25 by an improved structure for stiffening the shaft without increasing the overall weight of the shaft, or the shaft diameter. In fact, shaft diameters can be reduced. Accordingly, the diameter of rotor bores can be reduced so as to reduce rotor stresses.

More particularly, to accomplish this objective, in the illustrated arrangement, and as shown in FIG. 2, the composite drive shaft 25 includes a tubular steel shell 68 having a rotor connection flange 70 thereon connected to the bearing support housing flange 36 and a low pressure turbine rotor disc 72 by a plurality of connector bolts 73 secured in place by nuts 74.

The tubular steel shell 68 includes a balance rib 76 intermediate the ends thereof and further includes an annular surface groove recess 78 therein outboard of an annular lube tube support wall 80 of the shell 68. An outboard balance land 81 is formed on shell 68 in surrounding relationship to an internally splined surface 82 in shell 68. Surface 82 is coupled to the externally splined end 84 of the output shaft 46 as shown in FIG. 1. An open-ended extension 86 on the steel shell 68 defines a sealing surface 88 for engagement with an annular seal 90 carried by power shaft 46. A lubrication system 92 is telescoped into the interior of shaft 24. System 92 forms no part of the present invention and components thereof are not described for economy of description.

The tubular steel shell 68 thus defines high strength, tough, connector portions represented by the flange 70 and the splined surface 82 that are resistant to loadings imposed thereon during gas turbine engine operation. In one working embodiment, the steel shell had a case hardness of Rockwell 15N-92MIN and a core hardness of Rockwell C36-40.

While such a steel shell is of suitable strength and durability to carry operating loads between turbine and compressor components of a gas turbine engine, the modulus of elasticity of the steel shell has high flexure.

In accordance with the present invention, therefore, a thin sleeve insert 94 is shrunk-fit within an elongated bore 96 through an opening of the flanged end steel shell 68 extending between the structural connector represented by the flange 70 and a smaller diameter bore 80 formed within the steel shell 68 immediately inboard of the splined surface 82. The length of the tubular insert extends substantially through the length of the tubular steel shell 68 and, in one working embodiment, the outside diameter of the insert sleeve 94 was 0.005 to 0.0015 inches tight to the inside diameter of the bore 96. Moreover, the coefficient of expansion of insert sleeve 94 is slightly greater than the coefficient of expansion of shell 68 to maintain even tighter contact under operating conditions. Thus, the full outer planar extent of the insert sleeve 94 is located in contact with the inner surface of the tubular steel shell 68 through most of its length.

In accordance with the present invention, the illustrated insert sleeve 94 further includes a tapered nose 100 thereon to guide the insert sleeve 94 into its seated position within the bore 96. The material of the insert sleeve 94 is selected to have a greater modulus of elasticity than the steel outer shell 68 and is further characterized by having a density less than that of steel shell so that it will have a lesser weight than a comparable cross-section of steel which might be utilized to stiffen the composite shaft 25. In one working embodiment, the tubular insert element is of beryllium structural grade HP-21 with a chemical composition of assay beryllium:

| Beryllium Assay | % Minimum | 98.0 |
|---|---|---|
| Beryllium Oxide | % Maximum | 2.0 |
| Aluminum | PPM Maximum | 1500 |
| Carbon | PPM Maximum | 1500 |
| Iron | PPM Maximum | 1800 |
| Magnesium | PPM Maximum | 800 |
| Silicon | PPM Maximum | 800 |

Such material has a capability of stiffening the shaft 25 to control the first vibration bending mode to prevent excessive vibratory movement of the shaft 25 during engine operation.

While the embodiments of the present invention, as herein disclosed, constitute a preferred form, it is to be understood that other forms might be adopted.

The embodiments of the invention in which an exclusive property or privilege is claimed are defined as follows:

1. A power turbine rotor shaft construction having an increased fundamental bending vibration mode comprising a steel shell having connector means at opposite ends thereof, a central opening extending through said steel shell between said opposite ends of said steel shell, an entrance segment of said opening being of increased I.D. from one end of said steel shell, said steel shell having an annular abutment formed at one end of said entrance segment, a sleeve insert having an outside diameter tightly fit in contact with the inner surface of said steel shell between said one end of said steel shell and said annular abutment, said sleeve insert having a modulus of elasticity greater than that of said steel shell and having a density lower than that of said steel shell to produce stiffening of said steel shell whereby its fundamental bending vibrator mode is increased without excessively increasing the weight of the overall shaft construction.

2. A power turbine rotor shaft construction having an increased fundamental bending vibration mode comprising a steel shell having a connector flange at one end and a splined connector at the opposite end, a central opening extending through said steel shell, an entrance segment of said opening being of increased I.D. from said one end of said steel shell, said steel shell having an annular abutment formed at one end of said entrance segment, a tubular insert having an outside diameter tightly fit in contact with the inner surface of said steel shell between said one end of said steel shell and said annular abutment, said sleeve insert having a modulus of elasticity greater than that of said steel shell and having a density lower than that of said steel shell to produce stiffening of said steel shell whereby its fundamental bending vibration mode is increased without excessively increasing the weight of the overall shaft construction.

3. A power turbine rotor shaft construction having an increased fundamental bending vibration mode comprising an outer shell having a connector flange at one end and a splined connector at the opposite end, a central opening extending through said outer shell, an entrance segment of said opening being of increased I.D. from said one end of said outer shell, said outer shell having an annular abutment formed at one end of said entrance segment, a tubular insert having an outside diameter tightly fit in contact with the inner surface of said outer shell between said one end of said shell and said annular abutment, said sleeve insert having a modulus of elasticity greater than that of said outer shell and having a density lower than that of said outer shell to produce stiffening of said outer shell whereby its fundamental bending vibration mode is increased without excessively increasing the weight of the overall shaft construction.

4. A power turbine rotor shaft construction having an increased fundamental bending vibration mode comprising a steel shell having connector means at opposite ends thereof, a central opening extending through said steel shell between said opposite ends of said steel shell, an entrance segment of said opening being of increased I.D. from one end of said steel shell, said steel shell having an annular abutment formed at one end of said entrance segment, a sleeve insert having an outside diameter tightly fit in contact with the inner surface of said steel shell between said one end of said steel shell and said annular abutment, said sleeve insert being of beryllium to produce stiffening of said steel shell whereby its fundamental bending vibration mode is increased without excessively increasing the weight of the overall shaft construction.

* * * * *